United States Defensive Publication [19] (H) [11] T983,007

Leonard [43] Jun. 5, 1979

[54] CELLULOSE ESTER-ACRYLIC RESIN-MELAMINE-FORMALDEHYDE AQUEOUS EMULSION COATING COMPOSITION CONTAINING A COMBINATION SURFACTANT-CURING AGENT

[76] Inventor: Don R. Leonard, Rte. 15, 421 Old Castle Rd., Kingsport, Tenn. 37660

[21] Appl. No.: 911,633

[22] Filed: Jun. 1, 1978

[51] Int. Cl.[2] ..... C08L 1/14

[52] U.S. Cl. ..... 260/15; 260/17 R; 260/29.4 UA; 428/502

[57] ABSTRACT

Disclosed are aqueous emulsion coating compositions comprising a thermosetting acrylic resin, cellulose ester, melamine-formaldehyde crosslinking agent, a combination surfactant-curing agent and a suitable organic solvent. The cellulose ester is preferably cellulose acetate butyrate. The combination surfactant-curing agent is preferably ammonia- or amine-neutralized salts of sulfonated, ethoxylated hydrocarbons. The concentrate is emulsified in water and used as a coating composition. The coating has low solvent emission to the atmosphere when drying, provides a hard but flexible coating having excellent appearance, good durability, and rapid drying properties.

6 Claims, No Sheets Drawing,

12 Pages Specification

The file of this unexamined application may be inspected and copies thereof may be purchased (849 O.G. 1221, Apr. 9, 1968).